United States Patent [19]

Dorweiler et al.

[11] Patent Number: 4,863,672
[45] Date of Patent: Sep. 5, 1989

[54] ABSORBER ROD

[75] Inventors: Harald Dorweiler, Schifferstadt; Claus Elter, Bad Durkheim; Franz Grossert, Kroeckelbach; Hermann Schmitt, Winnweiler; Guenter Rohark, Edingen-Neckarhausen; Josef Schoening, Hambruecken, all of Fed. Rep. of Germany

[73] Assignee: Hochtemperatur-Reaktorbau GmbH, Fed. Rep. of Germany

[21] Appl. No.: 159,484

[22] Filed: Feb. 22, 1988

Related U.S. Application Data

[63] Continuation of Ser. No. 897,363, Aug. 18, 1986, abandoned.

[30] Foreign Application Priority Data

Aug. 16, 1985 [DE] Fed. Rep. of Germany ....... 3529242

[51] Int. Cl.$^4$ .............................................. G21C 7/10
[52] U.S. Cl. .................................... 376/226; 376/233; 376/243; 376/327; 376/333; 376/433; 376/305; 294/86.17; 294/906; 403/290
[58] Field of Search ............... 376/327, 333, 233, 243, 376/224, 226, 433, 305; 403/290, 377, 109; 294/906, 86.17, 86.24, 86.25, 86.32

[56] References Cited

U.S. PATENT DOCUMENTS

| 1,776,776 | 9/1930 | Blackmarr | 294/86.17 |
| 2,976,076 | 3/1961 | Farley | 294/86.32 |
| 3,137,635 | 6/1964 | Moore et al. | 376/433 |
| 3,142,627 | 7/1964 | Emerson | 376/433 |
| 3,519,536 | 7/1970 | Rausch | 376/226 |
| 3,627,067 | 12/1971 | Martinsen | 294/86.17 |
| 3,932,215 | 1/1976 | Kruger | 376/327 |
| 3,944,273 | 3/1976 | Ahlstone | 294/86.24 |
| 4,082,609 | 4/1978 | Schweiger | 376/226 |

FOREIGN PATENT DOCUMENTS

| 1911400 | 9/1970 | Fed. Rep. of Germany | 376/226 |
| 2066109 | 10/1970 | Fed. Rep. of Germany | . |
| 2049981 | 5/1972 | Fed. Rep. of Germany | 376/327 |
| 2828975 | 7/1978 | Fed. Rep. of Germany | . |
| 2925863 | 1/1981 | Fed. Rep. of Germany | 376/335 |
| 3143737 | 5/1983 | Fed. Rep. of Germany | 376/226 |
| 632625 | 1/1962 | Italy | 376/433 |
| 0008292 | 1/1979 | Japan | 376/233 |
| 937043 | 9/1963 | United Kingdom | 376/233 |

Primary Examiner—Harvey E. Behrend
Attorney, Agent, or Firm—Robert J. Koch

[57] ABSTRACT

An absorber rod for nuclear reactors with a pile of spherical fuel elements, which is inserted directly into the pile, in order to affect the prevailing neutron flux by absorber material located in an annular gap between two concentric cylindrical rod elements. The absorber rod has concentric rod elements arranged in pairs, a common rod tip and common connecting pieces. The rod elements are cooled by flow of gas and the inner cylindrical rod element performs the support function, i.e., it absorbs and transmits forces and moments originating in the movements of the rod during insertion and extraction.

5 Claims, 2 Drawing Sheets

ABSORBER ROD

This application is a continuation of application Ser. No. 897,363 filed Aug. 18, 1986, now abandoned.

BACKGROUND OF THE INVENTION

1. Field of the Invention

The invention relates to absorber rods for nuclear reactors with spherical fuel elements which are exhausted after a single passage through the core and more particularly absorber rods inserted directly into the pile in order to affect the prevailing neutron flux in the reactor by absorber material located in an annular gap between two concentrically arranged cylindrical rod elements.

2. Description of the Related Technology

Absorber rods are used in nuclear reactors to control the reactor output, the startup and shutdown processes, to equalize burnup, and to shut down the reactor. For this reason, they contain a neutron absorbing substance, i.e., an absorber material. The absorber material reduces the neutron flux and thus reactivity of the reactor depending on the immersion depth of the rod into the reactor filled with fuel elements based on its neutron capture cross section.

The neutron flux in the reactor attains its maximum flow density as a function of the burnup state of the fuel elements at different heights of the reactor. If the radiation intensity, i.e., the radioactivity of the fuel elements varies, the maximum neutron flux also changes.

In nuclear reactors having piles of spherical fuel elements, in contrast to nuclear reactors with block or rod shaped fuel elements, it is possible to replace fuel elements continuously, without interrupting the operation of the reactor, and thereby to affect the burnup state of the fuel elements in nuclear reactors having piles of spherical fuel element . The reactor may be adjusted so that the fuel elements are used up after a single passage and replaced by new ones. This operational principle is also called the OTTO principle (OTTO=once through then out). In reactors operated by the OTTO principle, the maximum of the neutron flux is located in an intermediate space between the pebble pile and the reactor cover. The absorber rods are inserted through this space into the reactor.

For reactor specific reasons the absorber rods project in their rest position into the reactor space above the pebble pile and are therefore constantly exposed to the reactor atmosphere. In the case of nuclear reactors according to the OTTO principle, the absorber rods in this area are exposed to additional neutron irradiation stresses.

Additional mechanical stresses appear upon rod insertion into the pile as there are no guide installations in nuclear reactors with piles of spherical fuel elements. These additional stresses result from forces against the fuel elements which oppose the insertion of the absorber rod. This resistance of the pile to insertion increases with the depth of the insertion. Absorber rods are only supported in a guide area in armored tubes in a fashion similar to a cantilever beam. Depending on its free length and section modulus the free end immersing into the peeble pile may be deflected from its immersion axis. Accordingly, the absorber rod is exposed to a lateral force producing a bending moment in addition to the force acting in a direction opposing its penetration. It is therefore necessary to take these types of operational mechanical stresses into account in the design of absorber rods for a nuclear reactor They must be correlated with the already present stressing of the rods. Absorber rods are stressed thermally upon their immersion in the reactor in two respects. The radiation heat emitted by the fuel elements leads to a heating of the rod and heat is generated in the absorber material of the absorber rod as the result of neutron absorption. An unacceptable increase in the temperature of the absorber rod due to these heat sources, i.e., an increase in temperature to a value at which the rod would lose its minimum mechanical strength, must be safely excluded. The same is true for the case in which the absorber rod would lose its necessary elasticity and ductility due to neutron embrittlement. Exposure to neutron radiation is, as set forth above, dependent on the layout and the mode of operation of the reactor, i.e., the position of the maximum neutron flux density in the reactor. Mechanical stresses are functions of geometrical parameters, such as the rod cross section, core diameter or core height and thermal stresses are determined by the fuel element inventory.

SUMMARY OF THE INVENTION

In view of relationships set forth above, it is an object of the invention to provide absorber rods which may be manufactured simply and cost effectively; the design configuration of which enables long term use free of incidents in a reactor having a spherical fuel element pile.

The absorber rod, according to the invention, includes concentrically arranged pairs of cylindrical rod elements. The inner rod element performs the support function, i.e., absorbing and transmitting the forces and moments resulting from the movement of the rod upon the insertion of the rod into the pebble pile. The inner rod is dimensioned to escape damage by deformation or fracture. The outer element serves as a protective shield for the inner rod element against excessive thermal and radioactive stresses. The absorber material serves to shield the inner rod element from radioactive stress.

The inner cylindrical rod element is advantageously designed as a support element to absorb mechanical stresses. It is protected by the absorber material against the constantly acting neutron radiation. The outer rod element may in this fashion have a function limited to maintaining the absorber element in its position and shielding the inner supporting tube. All of the outer mechanical forces and moments are introduced by the rod tip attached by welding and absorbed and transmitted by the inner tube.

The tip of the rod is generally an integral head piece welded to the adjacent inner and outer rod elements. The inner and outer rod elements are joined to the tip by respective annular weld joints axially offset relative to each other. For thermal and neutron physical reasons the weld is appropriately located as far as possible from the tip of the rod, preferably at a distance corresponding to the diameter of the rod, from the frontal plane of the rod tip. The head piece may exhibit a central bore with a cylindrical piece, which in turn supports a holding device for the head piece. In the event of a fracture of the absorber tip the holding device functions to retain the tip, thereby preventing its irreversible immersion in the pebble pile. In this manner even damaged absorber rods may be retrieved completely from the fuel element pile, without any potentially interfering residues remaining therein.

As mentioned above, gas flows through the absorber rods for cooling. It is advantageous to use part of the flow of cooling gas passing through the fuel element pile. This partial flow is separated above the fuel element pile where relatively low cooling gas temperatures are prevailing and guided through axially placed cooling gas slots distributed over the circumference of the outer rod element. By the appropriate choice of the size, number and axial positions of the slots on the absorber rod, adequately low material temperatures may be obtained in both the inner and the outer rod elements. It is possible in this manner to use the absorber rods which are designed according to the invention in high temperature reactors with cooling gas outlet temperatures of up to 750°. It is further possible to use them in nuclear reactors combined with gas turbine machines. In nuclear reactor plants of this type having closed gas loops, such as so-called single loop installations, the gas temperature in the reactor core may attain values of 750° to 950° C.

At least two inlet parts are provided in the outer rod element in axially different locations for introduction of the cooling gas. The inlets operate as a function of the position of the rod relative to the pebble pile. In principle, the part of the rod located in the pile is always cooled. The two inlet parts exhibit a large number of axially arranged inlet slots distributed over the circumference of the outer rod elements, thereby insuring uniform flow and cooling throughout the zone or area of the rod below the inlets. The cooling gas outlet is provided in the tip of the rod and are in the form of slots which have the advantage over bore holes in that they reduce the loss of pressure and improve cooling.

As the result of the aforedescribed cooling, both a radial and an axial temperature gradient are created in the absorber rod. In order to prevent the additional loading of the absorber rod, by stresses generated by restricted thermal expansion, the rod elements without a support function are mounted on one end only and are slidingly guided in a defined slot. To further enhance cooling, the inner rod element may be in the form of a ribbed tube.

In order to prevent the occurrance of notch effects and to minimize thermal stress peaks, care must be taken in the design of the single piece head portion or rod tip to provide a rounded structure terminating the annular gap between the outer and the inner connecting cylinders to which the outer and inner rod elements are joined. This measure prevents permanent damage such as cracking by radial deflections of the outer rod element transmitted to the outer cylindrical connecting piece of the head piece.

The absorber material, which may be absorber rings of boron carbide, is annular in shape and manufactured with uniform dimensions (diameter and height) for simplification and the reduction of costs. Spacers or rings are inserted between the inner and outer rod elements in order to keep the absorber material away from the joint location (weld) of the outer and inner rod element to the rod tip. This prevents undesirable carburization and carbide formation in the rod elements during welding and in operation. Furthermore, in this manner temperature and stress peaks are kept away from the weld joints. The spacers also serve to maintain annular gaps between the inner and the outer rod elements and the absorber material in order to prevent harmful reactions between the rod elements and the absorber material upon swelling of the absorber material under radiation. An axial gap between the inner and the outer rod element is not occupied to equalize absorber material axial swell under radiation thereby avoiding additional axial stresses in the absorber rod.

The absorber rod geometry is a smooth, cylindrical welded structure with a constant outer diameter. The outer surface of the rod is provided with an abrasion resistant layer, which is conveniently applied by means of flame spraying to prevent abrasion and the resulting variation in diameter, particularly in the area of bearing locations and barking devices. Coating layers produced in this manner are characterized by above average adhesion and a high density. Coating with chromium carbide has been found to be especially advantageous. Both the weakening of the outer rod element and abrasion on reactor components and fuel elements are prevented by maintenance of a smooth rod surface.

The absorber rod has a screwed-on coupling on its upper end to establish the connection with the associated rod drive. The coupling exhibits a spring elastic claw coupling and may be released by remote control. The coupling has two parts, a claw body with coaxially arranged circumferential claws and a cylindrical counterpart with a collar engaged by the claws. The two coupling halves are easily separated and axially displaced by a release device, which may be a circular, axially displaceable part pressuring the claws from its clamping position. Bores are provided on the word circumference, to be engaged by a holding tool for securing the rod during installation and dismantling.

This and further advantageous embodiments and improvements of the invention are set forth in the claims.

A greatly different layout of a shutdown rod for nuclear reactors with a pile of spherical fuel elements is shown in DE-2 066 109. It consists of a rod with two concentric cylindrical rod elements connected to a common tip. The compressive stress on the contact surface of the rod tip and fuel elements is reduced by an increased support surface. The solution consists of a recess or hollow in the rod tip adapted to the contour of the fuel element similar to recess 46. No further characteristics relevant to the present invention are disclosed. An embodiment of the invention is presented below with reference to the drawings, wherein the invention is shown in more detail, together with advantageous configurations and improvements.

BRIEF DESCRIPTION OF THE DRAWINGS

In the drawings:

FIG. 2a is an enlarged section of FIG. 2 and depicts the sliding connection between the outer rod element and the connector.

DETAILED DESCRIPTION OF THE PREFERRED EMBODIMENT

Figure 1:
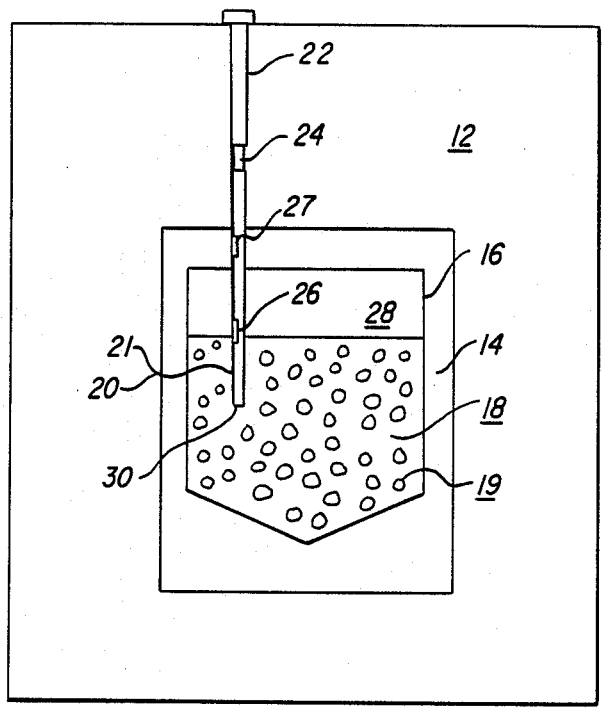
FIG. 1 shows a schematic view of an absorber rod according to the invention in a partially inserted state, in a pebble pile reactor located in a prestressed concrete vessel.

FIG. 1 shows in a schematic view a nuclear reactor power plant 10, comprising a prestressed concrete vessel 12, which in a cavity 14 contains a reactor 16 with a pile of spherical fuel elements 19, referred to briefly as the pebble pile 18. An absorber rod representing rods 20 or 21 immerses into the pebble pile 18. The absorber rod is guided in an armored tube 22 cast into the prestressed concrete 12 and moved by a piston drive 24. The absorber rods 20 and 21 exhibit two sets of elongated slots 26, 27 on their circumference in two axially offset areas. The spacing of the areas exhibiting slots 26, 27 relative to each other and the rod tip 30 is chosen so that cooling gas may enter from the intermediate space 28 located above the pebble pile 18 into the inside of the rod 20, 21 and flow through to the rod tip 30 for cooling upon the immersion of the rod 20, 21 into the pebble pile 18. By observing the geometric conditions, it is possible to assure that an area with slot 26 or 27, is in the intermediate space 28 of the reactor 16, providing access by the cooling gas into the rod.

Figure 2:
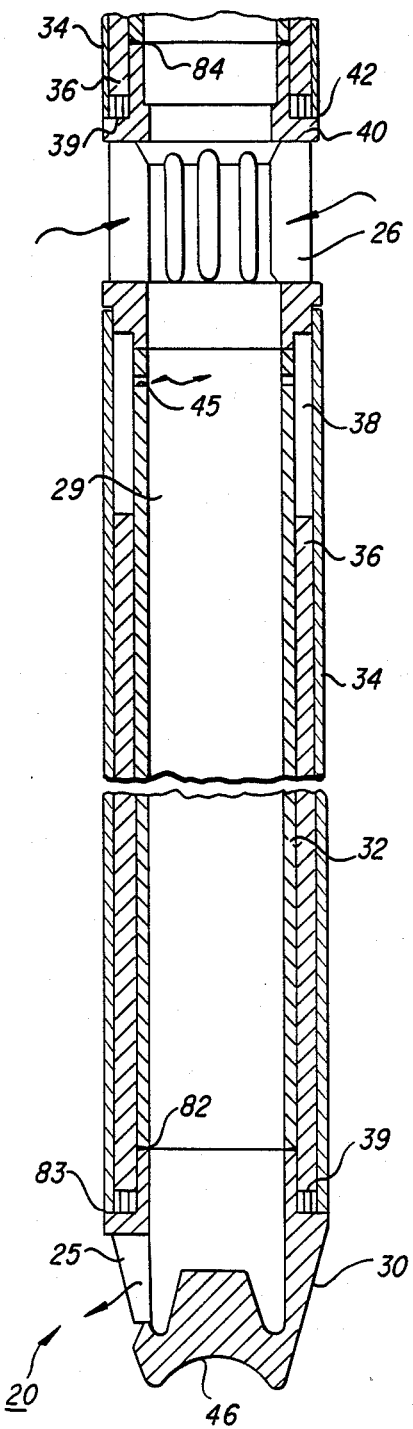
FIG. 2 shows an absorber rod according to the invention, the inner rod element of which performs the support function.

FIG. 2 shows an absorber rod 20 exhibiting an annular gap 38 formed by two concentric cylindrical rod element 32, 34. The absorber material 36 is located with the gap 28. The absorber rod 20 may be constructed in a stepped manner of equal length sections of rod elements 32, 34, joined together by coupling 40. The inner rod element 32 and the outer rod element 34 are welded to an integral tip 30 at the lower end of the rod illustrated at 82 and 83 respectively. The tip terminates in a cone and exhibits a nearly hemispherical recess 46 adapted to the shape of the fuel elements 19. The inner tube 32 has a thicker wall than the outer tube 34 to absorb and transmit the stresses resulting from the operation. A lower end of the inner tube or rod element 32 is welded to the rod tip 30 by a weld 82 or coupling 40 by a weld 84. The center piece of coupling 40 exhibits a plurality of axially extending radial slots 26 distributed over the circumference for the entry of the cooling gas. Only the lower portion of outer rod elements 34 are joined or welded to either the rod tip 30 or the coupling 40 by welds 83 and 42 respectively. The outer rod elements 34 are supported in a sliding fashion at their upper end, i.e., an annular gap remains between the outer rod element and coupling 40. This gap allows for thermal expansion and insures that the outer rod element does not perform an axial support function. Spacers 39 are inserted into the annular gap 38 at both the rod tip 30 and at the coupling 40, maintaining the absorber material 36 at an adequate distance from the joint location 42 (weld) of the outer rod element 34 to the rod tip 30 and coupling 40. A plurality of the outlet slots 25 are circumferentially distributed over the circumference in the cone area of the rod tip 30. A plurality of ventilating bores 45 are provided through the inner tube 32 establishing a connection between the inside 29 of the rod and the gap 38 thereby preventing an unacceptable pressure buildup as a result of swelling of absorber material 36 or the formation of gaseous decomposition products of absorber material 36.

Figure 3:
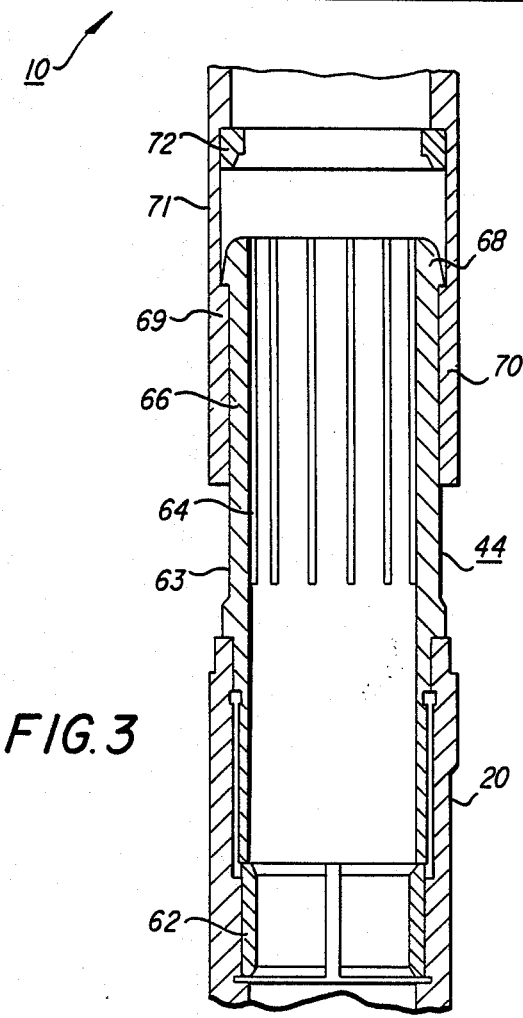
FIG. 3 shows the upper end of an absorber rod according to the invention, with a screwed-on claw coupling.

FIG. 3 shows a segment of a cross section through the releasable coupling 44 connecting the core rod 20 to a piston rod 61 of an actuating drive, not shown.

The coupling 44 is constructed of a claw body 63 screwed into the upper open end of the core rod 20. An insert 62 located under the claw body serves to close off the core rod 20. The tubular claw body 63 has a plurality of elongated slots 64 on its upper end uniformly distributed over the circumference; the slots are provided with a radius at their ends. In this manner uniform, coaxial plates 66 are formed, which each exhibit a claw-like nose 68 at their free end. The lower end of the piston rod 61 exhibits a shoulder 69 as the counter piece for this nose 68 to engage the nose 68. The shape of the plates 66, i.e., their thickness, width, and length, is chosen so that they are capable of moving inward in the manner of a flat spring. It is possible thereby to push a hollow cylinder 70 over the claw body 63, as shown in FIG. 3. The spring action plates 66 snap into the shoulder or collar 69 upon reaching it, thereby establishing a positive axial connection between the piston rod 61 and the core rod 20.

To release the coupling, a cylindrical ring 72 is inserted between the noses 68 and the cylinder wall 71, whereby the noses 68 are released from their positive connection with the collar 69, whereupon the piston rod 61 may be released from the coupling 44 by axial displacement. The cylinder ring 72 may be actuated by its own drive, not shown, or by advancing the piston rod 61 and fixing the core rod 20 until the cylinder ring 72 is engaged, as described above.

Figure 4:
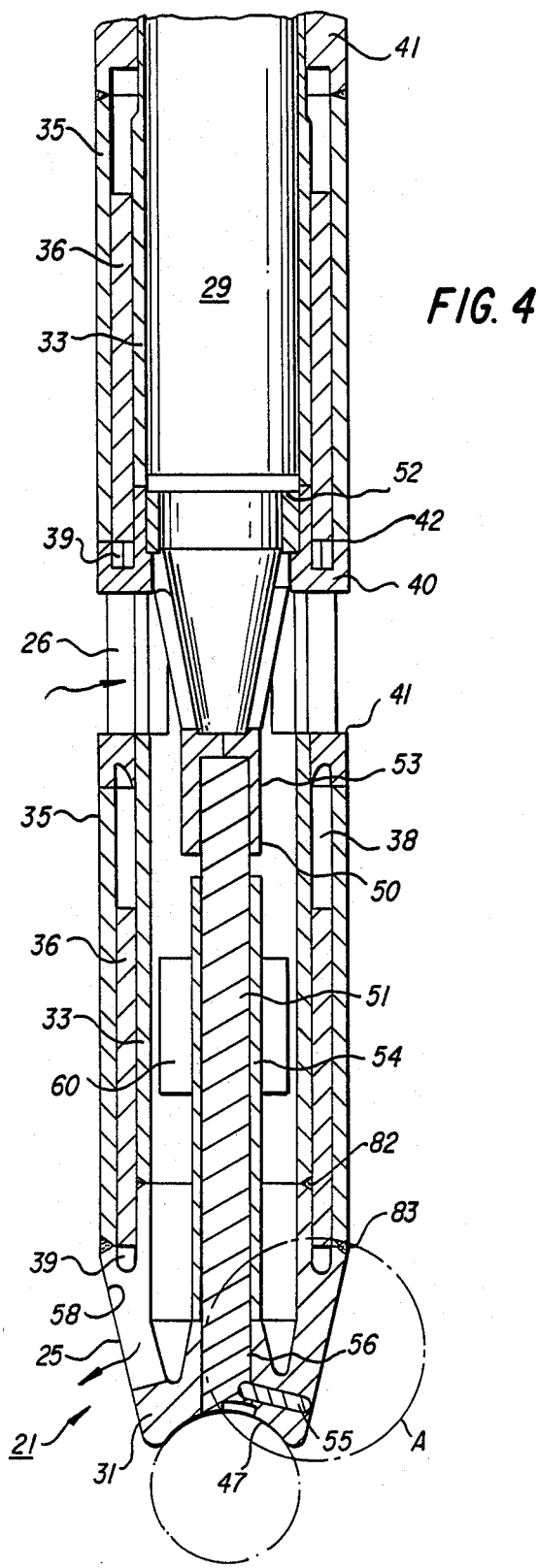
FIG. 4 shows an alternative embodiment of an absorber rod according to the invention.

FIG. 4 shows an alternative configuration of an absorber rod 21 according to the invention, where the rod has a modified rod tip 31 and a safety holder 50 described below. The rest of the configuration of the absorber 21 identically conforms to the principle shown in FIG. 2 and is therefore not described in detail.

The single piece rod tip 31 tapers conically from the connecting area 58 to the rod elements 33, 35, to a small frontal surface comprising a nearly hemispherical recess 47. An axial central passage bore 56 is provided, which continues in a thin walled, hollow guide cylinder 54 and receives a holding rod 51. This holding rod, which completely fills the bores 56, is fixedly engaged at its free or upper end to a supporting fitting 53, which is part of a safety holder 50.

Spacers 60 a reuniformly distributed at approximately one half the length of the guide cylinder 54 on the outer circumference to prevent lateral play by resting against the inner rod element 33.

The safety holder 50 is joined to the connecting 40, which is closest to the rod tip 31, by a holding ring 52 or other appropriate means. The safety holder 50 serves to hold the rod tip 31 if, upon a fracture, it is released from the outer rod element 35. The safety holder further prevents a tip from immersion into, and retention by, the pebble pile, which would have severe operational consequences subsequent to a fracture. The safety holder may advantageously exhibit a downwardly converging conical portion which narrows from a region connected to the coupling 40 to a holding rod supporting fitting. The conical portion may advantageously include slots to allow cooling gas to flow from an upper interior area, in a downward direction. The slots may be offset from the connecting piece slots 26 to facilitate appropriate downward flow into a lower interior area.

A further advantage of the holding device, is that the cooling gas flowing through the inside of the rod contributes intensively to cooling the inner rod element 33 in the remaining concentric annular space within the guide cylinder 54 and around the holding rod 51 and the support fitting 53. The length of the holding rod 51 is chosen so that it may be introduced free of play into the support fitting 53, and yet does not protrude into the concave recess 47.

The length and the number of the individual segments of the rod elements 33, 35 is determined by the geometric conditions of the reactor and the mode of operation intended. Advantageously at least 3 segments may be utilized. It may be advantageous to provide the connecting pieces with inlet slots 26 in a differentiated manner, i.e., optionally alternating them with and without slots 26.

Figure 5:
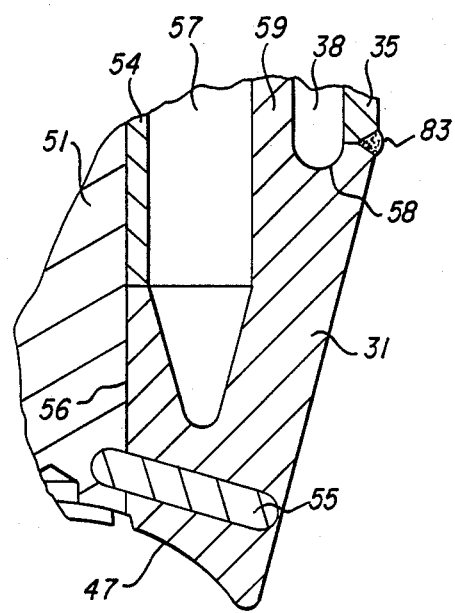
FIG. 5 shows an enlarged cross-section of the absorber rod tip shown in FIG. 4.

FIG. 5 shows an enlarged section A of FIG. 4, illustrating details for the configuration of rod tip 31. A half of the rod tip 31 is shown in a longitudinal section.

The rod tip, to be made as a single piece turning, comprises an axially extending center passage bore 56, into which a holding rod 51 is set, said holding rod terminating on the bottom flush with the concave recess 47.

The rod tip 31 expands to the diameter of the outer rod element 35 beginning at this frontal surface. The rod tip is fixedly connected by the weld 83 to the outer rod element 35. This weld 83 should be located as high up as possible. A connecting fitting 59 is concentric with the outer rod element. An axially offset end of the inner rod element 33 is welded to the connecting fitting 59. The annular space 38 formed between the two rod elements 33, 35 is bounded by an annular frontal surface let into the rod tip 31 and exhibits a semicircular cross section.

The relatively large radius of this annular surface corresponds to approximately one-half of the distance of the rod elements 33, and is primarily intended to prevent notch stresses which are superposed on the stresses generated by the differential thermal expansion caused by the different heat and unequal material thicknesses of the joint section 58 and the wall thicknesses in the weld zones. Similarly the downward extension of annular space 57 formed between the inner rod element 33 and the centrally placed guide cylinder 54 surrounding the holding rod 51 exhibits an inwardly converging cross section. The outer surface of the convergence is advantageously parallel to the outer surface of the rod tip so that the outer wall of the rod tip exhibits a uniform thickness. The lower extension annular space 57 has a triangular cross section with a rounded (circular) point. The absorber rod tip 30 may be advantageously fastened to the holding rod 51 by a holding pin 55.

In this manner, the stresses created by the difference in material thicknesses are kept low and notch stresses are avoided.

The absorber rods 20 are inserted into the reactor 16 until their tips 30 are located directly above the pile 18 to correct power fluctuations in the operation of the reactor with sufficient speed. The maximum neutron flux is located above the pile 18 in the intermediate space 28 of the reactor 16 when the reactor is operated according to the OTTO principle. Constant exposure to neutron radiation results in a reduction in ductility and load carrying ability of the outer sheathing tubes of the absorber rods by neutron embrittlement. In order to assure the maintenance of regular operations under these conditions, the absorber rod 20 is arranged so that the force transmitting rod elements 32 are arranged in the interior 29 of the rod and surrounded by the layer of the absorber material 36. The outer sheathing tube 34 is intended merely to maintain the absorber material in position. In accordance with this layout it is possible to operate absorber rods over extended periods of time in the intended fashion, without the risk of premature failures resulting from fractures caused by increasing brittleness. The spacing of the cooling gas inlet slots 26 facilitates cooling the inside 29 in any rod position, even upon insertion into the pebble pile 18. A slot area is always disposed in the intermediate space 28 filled with the cooling gas by an appropriately chosen geometric adaptation of the slot areas to the geometry of the reactor. This enables continuous entry of cooling gas to the inside 29 of the rod 20, flow therethrough to cool it, and exit at the tip 30. Cooling gas will flow through the interior of the absorber rods, through entry slots 26 and outlet slots 25 so long as the pressure gradient is equal to or less than the corresponding pressure gradient of the pile.

The absorber rods according to the invention may be produced simply and cost effectively. The simple layout enables use of common shapes and tubes.

We claim:

1. In combination with a nuclear reactor comprising an absorber rod control drive disposed above a bed of spherical fuel elements having an upper level and further comprising circulating cooling gas through said spherical fuel elements, an absorber rod comprising:
   a rod tip exhibiting a conically narrowing configuration;
   a lower rod segment comprising:
      (a) a cylindrical lower inner rod element connected to said rod tip at a lower end;
      (b) a cylindrical lower outer rod element arranged concentrically to said lower inner rod element configured as an outer sheath, connected to said rod tip at said lower end;
      (c) a first annular gap defined between said lower inner rod element and said lower outer rod element; and
      (d) absorber material arranged in said first annular gap;
   an upper rod segment comprising:
      (a) a cylindrical upper inner rod element;
      (b) a cylindrical upper outer rod element concentrically arranged with said upper inner rod element;
      (c) a second annular gap defined between said upper inner rod element and said upper outer rod element; and
      (d) absorber material arranged in said second annular gap;
   means for coupling said upper rod segment to said lower rod segment wherein said means for coupling is positively connected to an upper end of said lower inner rod element, a lower end of said upper inner rod element, and a lower end of said upper outer rod element; said means for coupling comprising a first portion having a diameter and a second portion having a smaller diameter than said first portion;
   a third annular gap axially disposed between said upper end of said lower outer rod element and said first portion of said means for coupling wherein said upper end of said lower outer rod element does not perform an axial support function and slides over said second portion of said means for coupling in response to thermal expansion;
   means for admitting cooling gas into an interior area of said absorber rod wherein said means for admitting comprises a plurality of circumferentially distributed, axially elongated slots arranged in said means for coupling; and means for releasably connecting said upper rod segment to said absorber rod drive, said means for releasably connecting comprising a claw body fixedly attached to said upper rod segment.

2. The combination according to claim 1, further comprising remotely actuable for releasing said means for releasably connecting said upper rod segment, wherein said means for releasably connecting is a plurality of deflectable claw members and said means for releasing is an axially displaceable ring configured to deflect said claw members upon displacement.

3. The combination according to claim 2, wherein said upper rod segment comprises sub-segments axially connected to one another wherein at least two sub-segments are coupled by a coupling exhibiting circumferentially distributed axially elongated slots.

4. The combination according to claim 3, further comprising a holding rod connecting said rod tip to a safety holder fixed to said means for coupling wherein said holding rod is attached within a holding rod guide cylinder abutting said rod tip; and means for spacing and holding rod guide cylinder from an interior surface of said lower inner rod element.

5. An absorber rod according to claim 1 wherein said rod tip further exhibits a lower spherical recess.

* * * * *